(12) United States Patent
Hou et al.

(10) Patent No.: US 12,475,588 B2
(45) Date of Patent: Nov. 18, 2025

(54) SYSTEMS AND METHODS FOR OBJECT DETECTION INCLUDING POSE AND SIZE ESTIMATION

(71) Applicant: Google LLC, Mountain View, CA (US)

(72) Inventors: Tingbo Hou, Santa Clara, CA (US); Adel Ahmadyan, Mountain View, CA (US); Jianing Wei, Cupertino, CA (US); Matthias Grundmann, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 245 days.

(21) Appl. No.: 17/800,688

(22) PCT Filed: Feb. 18, 2020

(86) PCT No.: PCT/US2020/018545
§ 371 (c)(1),
(2) Date: Aug. 18, 2022

(87) PCT Pub. No.: WO2021/167586
PCT Pub. Date: Aug. 26, 2021

(65) Prior Publication Data
US 2023/0351724 A1    Nov. 2, 2023

(51) Int. Cl.
*G06T 7/70* (2017.01)
*G06V 10/26* (2022.01)
(Continued)

(52) U.S. Cl.
CPC ............... *G06T 7/70* (2017.01); *G06V 10/26* (2022.01); *G06V 10/454* (2022.01);
(Continued)

(58) Field of Classification Search
CPC ... G06T 7/70; G06T 2207/20081; G06T 7/60; G06T 2207/20041; G06V 10/26; G06V 10/454; G06V 10/457; G06V 10/751; G06V 10/817; G06V 10/82; G06V 20/00; G06V 20/46; G06V 20/64; G06V 2201/07; G06V 2201/12; G06F 18/2413
See application file for complete search history.

(56) References Cited

U.S. PATENT DOCUMENTS

| | | |
|---|---|---|
| 2016/0379083 A1 | 12/2016 | Sala et al. |
| 2017/0236032 A1 | 8/2017 | Lin et al. |
| 2021/0110141 A1 | 4/2021 | Moravec et al. |

OTHER PUBLICATIONS

Boonim, Kanjana. "Analysis of Playing Positions in Tennis Match Videos to Assess Competition Using a Centroid Clustering Heatmap Prediction Technique." Journal of Advances in Information Technology 14.1 (2023). (Year: 2023).*

(Continued)

*Primary Examiner* — Charles T Shedrick
(74) *Attorney, Agent, or Firm* — DORITY & MANNING P.A.

(57) ABSTRACT

The present disclosure is directed to systems and methods for performing object detection and pose estimation in 3D from 2D images. Object detection can be performed by a machine-learned model configured to determine various object properties. Implementations according to the disclosure can use these properties to estimate object pose and size.

20 Claims, 8 Drawing Sheets

(51) Int. Cl.

| | |
|---|---|
| *G06V 10/44* | (2022.01) |
| *G06V 10/75* | (2022.01) |
| *G06V 10/80* | (2022.01) |
| *G06V 10/82* | (2022.01) |
| *G06V 20/00* | (2022.01) |
| *G06V 20/40* | (2022.01) |
| *G06V 20/64* | (2022.01) |

(52) U.S. Cl.
CPC .......... *G06V 10/457* (2022.01); *G06V 10/751* (2022.01); *G06V 10/817* (2022.01); *G06V 10/82* (2022.01); *G06V 20/00* (2022.01); *G06V 20/46* (2022.01); *G06V 20/64* (2022.01); *G06T 2207/20081* (2013.01); *G06V 2201/07* (2022.01); *G06V 2201/12* (2022.01)

(56) References Cited

OTHER PUBLICATIONS

A. Newell, K. Yang, and J. Deng. Stacked hourglass networks for human pose estimation. In ECCV, 2016. (Year: 2026).*

International Preliminary Report on Patentability for Application No. PCT/US2020/018545, mailed Sep. 1, 2022, 14 pages.

Ahmadyan et al., "Instant 3D Object Tracking with Applications in Augmented Reality", arXiv:2006.13194v1, dated Jun. 23, 2020, 4 pages.

Brachmann et al., "Learning 6D Object Pose Estimation Using 3D Object Coordinates", European conference on computer vision, 2014, pp. 536-551.

Ding et al., "Object as Distribution", arXiv:1907.12929v1, dated Jul. 25, 2019, 10 pages.

Duan et al., "CenterNet: Keypoint Triplets for Object Detection", IEEE/CVF international conference on computer vision, 2019, pp. 6569-6578.

He et al., "Mask R-CNN", IEEE International Conference on Computer Vision (ICCV), 2017, pp. 2961-2969.

Hinterstoisser et al., "Model Based Training, Detection and Pose Estimation of Texture-Less 3D Objects in Heavily Cluttered Scenes", Asian conference on computer vision, 2012, pp. 548-562.

Hou et al., "MobilePose: Real-Time Pose Estimation for Unseen Objects with Weak Shape Supervision", arXiv:2003.03522v1, dated Mar. 7, 2020, 16 pages.

Howard et al., "MobileNets: Efficient Convolutional Neural Networks for Mobile Vision Applications", arXiv:1704.04861v1, dated Apr. 17, 2017, 9 pages.

Hu et al., "Segmentation-driven 6D Object Pose Estimation", IEEE/CVF Conference on Computer Vision and Pattern Recognition, 2019, pp. 3385-3394.

International Search Report and Written Opinion for Application No. PCT/US2020/018545, mailed Jan. 21, 2021, 20 pages.

Kehl et al., "Deep Learning of Local RGB-D Patches for 3D Object Detection and 6D Pose Estimation", European conference on computer vision, 2016, pp. 205-220.

Kehl et al., "SSD-6D: Making RGB-Based 3D Detection and 6D Pose Estimation Great Again", IEEE international conference on computer vision, 2017, pp. 1521-1529.

Law et al., "CornerNet: Detecting Objects as Paired Keypoints", European conference on computer vision (ECCV), 2018, pp. 734-750.

Lepetit et al., "EPnP: An Accurate O(n) Solution to the PnP Problem", International journal of computer vision, vol. 81, No. 2, 2009, pp. 155-166.

Li et al., "A Unified Framework for Multi-View Multi-Class Object Pose Estimation", European conference on computer vision (eccv), 2018, pp. 254-269.

Li et al., "CDPN: Coordinates-Based Disentangled Pose Network for Real-Time RGB-Based 6-DoF Object Pose Estimation", IEEE/CVF International Conference on Computer Vision, 2019, pp. 7678-7687.

Li et al., "DeepIM: Deep Iterative Matching for 6D Pose Estimation", European Conference on Computer Vision (ECCV), 2018, pp. 683-698.

Lin et al., "Focal Loss for Dense Object Detection", IEEE international conference on computer vision, 2017, pp. 2980-2988.

Lugaresi et al., "MediaPipe: A Framework for Building Perception Pipelines", arXiv:1906.08172v1, dated Jun. 14, 2019, 9 pages.

Mousavian et al., "3D Bounding Box Estimation Using Deep Learning and Geometry", IEEE conference on Computer Vision and Pattern Recognition, 2017, pp. 7074-7082.

Park et al., "Pix2Pose: Pixel-Wise Coordinate Regression of Objects for 6D Pose Estimation", IEEE/CVF International Conference on Computer Vision, 2019, pp. 7668-7677.

Peng et al., "PVNet: Pixel-wise Voting Network for 6DoF Pose Estimation", IEEE/CVF Conference on Computer Vision and Pattern Recognition, 2019, pp. 4561-4570.

Rad et al., "BB8: A Scalable, Accurate, Robust to Partial Occlusion Method for Predicting the 3D Poses of Challenging Objects without Using Depth", arXiv:1703.10896v1, dated Mar. 31, 2017, 9 pages.

Redmon et al., "YOLO9000: Better, Faster, Stronger", arXiv:1612.08242v1, dated Dec. 25, 2016, 9 pages.

Ren et al., "Faster R-CNN: Towards Real-Time Object Detection with Region Proposal Networks", Advances in neural information processing systems 28, 2015, 9 pages.

Sandler et al., "MobileNetV2: Inverted Residuals and Linear Bottlenecks", IEEE conference on computer vision and pattern recognition, 2018, pp. 4510-4520.

Song et al., "HybridPose: 6D Object Pose Estimation under Hybrid Representations", arXiv:2001.01869v4, dated Oct. 16, 2020, 17 pages.

Sundermeyer et al., "Implicit 3D Orientation Learning for 6D Object Detection from RGB Images", European conference on computer vision (ECCV), 2018, pp. 699-715.

Tekin et al., "Real-Time Seamless Single Shot 6D Object Pose Prediction", IEEE conference on computer vision and pattern recognition, 2018, pp. 292-301.

Tremblay et al., "Deep Object Pose Estimation for Semantic Robotic Grasping of Household Objects", arXiv:1809.10790v1, dated Sep. 27, 2018, 11 pages.

Van Dijk et al., "How Do Neural Networks See Depth in Single Images?", IEEE/CVF International Conference on Computer Vision, 2019, pp. 2183-2191.

Wang et al., "DenseFusion: 6D Object Pose Estimation by Iterative Dense Fusion", IEEE/CVF conference on computer vision and pattern recognition, 2019, pp. 3343-3352.

Wang et al., "Normalized Object Coordinate Space for Category-Level 6D Object Pose and Size Estimation", IEEE/CVF Conference on Computer Vision and Pattern Recognition, 2019, pp. 2642-2651.

Xiang et al., "PoseCNN: A Convolutional Neural Network for 6D Object Pose Estimation in Cluttered Scenes", arXiv:1711.00199v3, dated May 26, 2018, 10 pages.

Zakharov et al., "DPOD: 6D Pose Object Detector and Refiner", IEEE/CVF international conference on computer vision, 2019, pp. 1941-1950.

Zhou et al., "Objects as Points", arXiv:1904.07850v2, dated Apr. 25, 2019, 12 pages.

Ahmadyan et al., "Instant 3D Object Tracking with Applications in Augmented Reality", arXiv:2006.13194v1, Jun. 23, 2020, 4 pages.

Baker et al., "Lucas-Kanade 20 Years On: A Unifying Framework", In International Journal of Computer Vision, vol. 56, 2004, 194 pages.

Benhimane et al., "Real-Time Image-Based Tracking of Planes using Efficient Second-Order Minimization", 2004 IEEE/RSJ International Conference on Intelligent Robots and Systems, Sendai, Japan, Sep. 28-Oct. 2, 2004, pp. 943-948.

Ding et al., "Object as Distribution", arXiv:1907.12929v1, Jul. 25, 2019, 10 pages.

Github.com, "MediaPipe Objectron", https://github.com/google-ai-edge/mediapipe/blob/master/docs/solutions/objectron.md, Nov. 15, 2024, 18 pages.

Google Research Blog, "Real-Time 3D Object Detection on Mobile Devices with MediaPipe", Mar. 11, 2020, https://research.google/

(56) References Cited

OTHER PUBLICATIONS blog/real-time-3d-object-detection-on-mobile-devices-with-mediapipe/, retrieved on Jan. 3, 2025, 8 pages.
Hou et al., "MobilePose: Real-Time Pose Estimation for Unseen Objects with Weak Shape Supervision", arXiv:2003.03522v1, Mar. 7, 2020, 16 pages.
Hu et al., "Joint Monocular 3D Vehicle Detection and Tracking", 2019 IEEE/CVF International Conference on Computer Vision, Seoul, South Korea, Oct. 27-Nov. 2, 2019, 10 pages.
Hu et al., "Segmentation-Driven 6D Object Pose Estimation", 2019 IEEE/CVF Conference on Computer Vision and Pattern Recognition, Long Beach, California, United States, Jun. 15-19, 2019, 10 pages.
International Preliminary Report on Patentability for PCT/US2020/018545, mailed on Sep. 1, 2022, 14 pages.
Lepetit et al., "EPnP: An Accurate (n) Solution to the PnP Problem", International Journal of Computer Vision, vol. 81, No. 2, Feb. 2009, 23 pages.
Li et al., "Stereo Vision-Based Semantic 3D Object and Ego Motion Tracking for Autonomous Driving", Fifteenth European Conference on Computer Vision, Munich, Germany, Sep. 8-14, 2018, 16 pages.
Liang et al., "Planar Object Tracking in the Wild: A Benchmark", arXiv:1703.07938v2, May 22, 2018, 8 pages.
Osep et al., Combined Image-and World-Space Tracking in Traffic Scenes, 2017 Institute of Electrical and Electronics Engineers International Conference on Robotics and Automation, Singapore, Singapore, May 29-Jun. 3, 2017, 9 pages.
Peng et al., "PVNet: Pixel-Wise Voting Network for 6DoF Pose Estimation", 2019 IEEE/CVF Conference on Computer Vision and Pattern Recognition, Long Beach, California, United States, Jun. 15-19, 2019, 10 pages.
Pirchheim et al., "Homography-Based Planar Mapping and Tracking for Mobile Phones", 2011 Institute of Electrical and Electronics Engineers International Symposium on Mixed and Augmented Reality, Basel, Switzerland, Oct. 26-29, 2011, 11 pages.
Prince et al., "Augmented Reality Camera Tracking with Homographies", Institute of Electrical and Electronics Engineers Computer Graphics and Applications, vol. 22, Issue 6, Nov. 2002, pp. 39-45.
Sandler et al., "MobileNetV2: Inverted Residuals and Linear Bottlenecks", arXiv:1801.04381v4, Mar. 21, 2019, 14 pages.
Sharma et al., "Beyond Pixels: Leveraging Geometry and Shape Cues for Online Multi-Object Tracking", arXiv:1802.09298v2, Jul. 27, 2018, 8 pages.
Wei et al., "Instant Motion Tracking and Its Applications to Augmented Reality", arXiv:1907.06796v1, Jul. 16, 2019, 4 pages.
Weng et al., "A Baseline for 3D Multi-Object Tracking", arXiv:1907.03961v4, Jul. 4, 2020, 11 pages.
Zhou et al., "Objects as Points", arXiv:1904.07850v2, Apr. 25, 2019, 12 pages.
Zhou et al., "Tracking Objects as Points", arXiv:2004.01177v2, Aug. 21, 2020, 22 pages.
Chinese Search Report Corresponding to Application No. 2020800970800 on Sep. 16, 2025.

* cited by examiner

SYSTEMS AND METHODS FOR OBJECT DETECTION INCLUDING POSE AND SIZE ESTIMATION

PRIORITY CLAIM

This application is based upon and claims the right of priority under 35 U.S.C. § 371 to International Application No. PCT/US2020/018545 filed on Feb. 18, 2020, which is incorporated by reference herein.

FIELD

The present disclosure relates generally to computer vision. More particularly, the present disclosure relates to computer-implemented systems and methods which can provide more efficient models for performing object detection and pose estimation in three dimensions (3D).

BACKGROUND

Object detection and pose estimation in 3D have many applications across computer vision, augmented reality (AR), autonomous driving, and robotics. The problem remains extremely challenging when the input is only a single image and there is no prior knowledge of the objects. On-device applications add layers of complexity to the problem such as expectations that models should run in real-time with limited size. Additionally, unlike self-driving cars where the camera's height is fixed and there are strong visual depth cues, typical on-device models for mobile devices such as smartphones have to learn rotation as well as depth.

SUMMARY

The present disclosure is directed to systems and methods for performing object detection and pose estimation in 3D from 2D images. Object detection can be performed by a machine-learned model configured to determine various object properties. Implementations according to the disclosure can use these properties to estimate object pose and size.

One example aspect of the present disclosure includes methods for determining coordinates for bounding box vertices using a machine-learned object detection model.

Another example aspect of the present disclosure includes methods for training the machine-learned object detection model using synthetic data. The synthetic data can be generated using virtual models of various objects placed in a scene using an augmented reality engine.

Another example aspect of the present disclosure includes machine-learned models having a multi-headed architecture.

Other aspects of the present disclosure are directed to various systems, apparatuses, non-transitory computer-readable media, user interfaces, and electronic devices which implement techniques disclosed herein or that can be derived through practice of the disclosure.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

In FIG. 3A additional model output is displayed in the upper right corner of the middle row of images. The additional model output illustrates a segmentation mask.

Figure 1A:
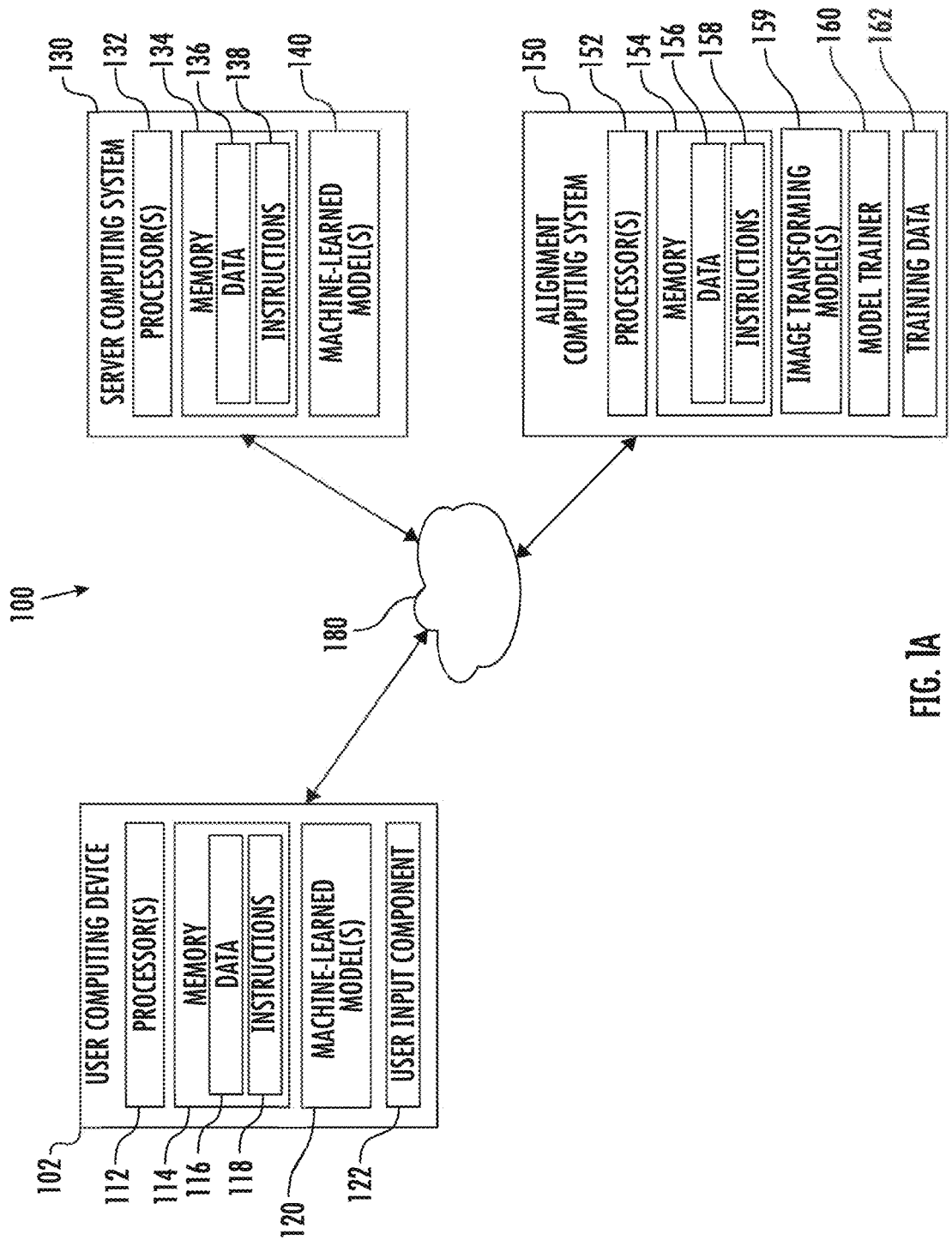
FIG. 1A illustrates an example computing system including one or more machine-learned model(s) in accordance with example implementations of the present disclosure.

Reference numerals that are repeated across plural figures are intended to identify the same features in various implementations.

DETAILED DESCRIPTION

Overview

Generally, the present disclosure is directed to systems and methods for performing object detection and may provide advantages for performing object detection on local devices such as smartphones. Object detection can include a variety of object properties which together are referred to as 9DoF or 9 degrees of freedom. These properties can include an x, y, z-coordinate position, a yaw, pitch, roll rotational orientation (together 6DoF pose), and a length, width, height, object size (together 3DoF physical size). Combinations of these properties, including all properties, can be extracted using example implementations according to the present disclosure. Further, these properties can be determined using two-dimensional (2D) photographic imagery at a relative scale. The relative scale can be transformed to definite values (e.g., meters or inches) by mapping the relative scale to physical values that can be determined using camera intrinsics and/or augmented reality (AR) data associated with the 2D photographic imagery.

Example implementations according to the present disclosure can utilize a multi-task (e.g., multi-headed) machine-learned model to determine at least two features of 2D image data that can be used for object detection. As one example, the machine-learned model can include a first head configured to generate a centroid heat map which includes heat values for each pixel based on a prediction whether the pixel depicts a centroid of an object. For example, the centroid heatmap(s) can be heatmaps with bivariate kernels dynamic to object size. As another example, the machine-learned model can include a second head configured to generate multiple distance fields that define distance values for each pixel indicating a distance to one of a plurality of vertices associated with a bounding box for the object. Since multi-headed models can jointly learn together, some example implementations can include a third head configured to generate a segmentation mask; however, a machine-learned model having a third head is not required to perform object detection according to example implementations. Likewise, different combinations of two or more of the heads described above (or for performing other tasks) can be used as well.

To extract object properties, example implementations can include methods for determining one or more labels for the object such as labels for constructing a 3D bounding box for the object. The 3D bounding box can be defined by vertices that together define a volume and surface boundaries for the object. As one example, a bounding box can be defined as a rectangular prism having 6 faces (e.g., front, back, left, right, top, and bottom) and 8 vertices (e.g., 4 for the top face and 4 for the bottom face). Using example methods according to the present disclosure, relative coordinate positions can be determined in two dimensions (e.g., x-coordinate and y-coordinate) for each of the 8 vertices. For certain example methods, the inclusion of AR data and/or camera intrinsics can be used to determine an additional coordinate location (e.g., z-coordinate) to define a 3-dimensional bounding box that can represent the object size, and location in the image. Further, the object orientation and/or translation can be determined based on location of the vertices and size of the bounding box. Thus, in some example implementations, to go from 2D to 3D, the EPnP algorithm can be used with orthogonal basis to recover 3D boxes up to scale and planes (e.g. a table or a floor) from an AR session can be used to determine the metric scale.

As an example for illustration, consider browsing a furniture store for decorating a new house. Rather than coming to the store with a list of measurements, a mobile device using an example implementation according to the disclosure can obtain an image of a piece of furniture and determine 3D coordinates for a bounding box associated with the piece of furniture. This data can be stored and subsequently used to determine if the piece of furniture would fit in a space. As another example, consider processing a video stream on a mobile device (e.g., video from a drone or other autonomous vehicle or robot). The video stream is made up of 2D imagery including objects for detection such as for collision avoidance or navigation. Using example implementations according to the present disclosure, the drone can infer object position and size in substantially real-time to improve collision avoidance or direct navigation and estimate distance.

Thus, example aspects of the present disclosure provide a novel multi-task learning network with multiple heads such as: a heatmap with dynamic bivariate kernels, distance fields of bounding box vertices, and/or semantic segmentation of targets. The model can detect objects and estimate their poses and sizes in a single shot. Using these in combination with geometry-based lifting, 3D bounding boxes of objects up to scale can be derived. Metric scale can be further determined using detected planes in the scene. The proposed model is ultra-lightweight and can run real-time on a smart phone.

Another example aspect of the present disclosure resolves the issue of lack of training data for the 9 degree of freedom detection task. In particular, some example implementations can be trained using synthetic training datasets including virtual models of objects placed in a scene and generated using an augmented reality engine (e.g., ARCore and ARKit). In this manner, the synthetic datasets can be created to include labels defining the exact orientation, position, and boundaries of the object since these properties can be associated with the virtual model as inserted into the scene. While this data is synthetic, it can be generated to replicate real data based on physical features such as objects being in contact with surfaces detected in the scene, or the object being obscured by physical items that are positioned in front of it based on the camera view. The synthetic data can be generated quickly, and labels automatically generated, which provides a major benefit when training object detection models since datasets can include labels for information that is often difficult to produce using real data such as segmentation masks. Further, the multi-headed nature of implementations according to the present disclosure can allow the object detection model to learn from the segmentation masks or other features included in synthetic data to improve prediction in other heads.

Aspects of the synthetic dataset can include one or more augmented images that may be generated using the augmented reality engine. The augmented images can be produced by obtaining a three-dimensional model of an object (e.g., a virtual object), and obtaining data including one or more image frame depicting a scene (e.g., using a device including an augmented reality engine, using multiple devices, and/or accessing saved AR data). The virtual object can then be positioned in the scene (e.g., using an AR engine) at a specified position, and orientation. Further the augmented image can be associated with one or more training labels such as identifies the virtual object, indicates the position of the virtual object within the scene (e.g., a label defining an object centroid and/or vertices of a bounding box for the object in x,y-coordinates), indicates the orientation of the virtual object within the scene (e.g., a label defining rotation along 2-3 coordinate axes), and/or indicates a segmentation mask of the virtual object and the scene (e.g., a label defining a pixel as associated with the virtual object or associated with the scene).

Implementations according to the present disclosure include computing systems and computer-readable instructions for three-dimensional object detection as well as training said models for three-dimensional object detection. Example aspects of these methods and systems can include operations such as obtaining a two-dimensional image that includes imagery of an object for detection. Aspects of the two-dimensional image can include a dimensionality defined by a plurality of pixels. Each pixel can define two coordinates of the two-dimensional image (e.g., an x-coordinate and a y-coordinate) along with a pixel value (e.g., R, G, B color values). This image data can be provided a machine-learned object detection model which can be trained according to example implementations of the present disclosure. The machine-learned object detection model generally includes at least two heads: a first head configured to generate a centroid heat map that can provide a respective heat value for each of the plurality of pixels, the respective heat value describing a probability for the pixel that a centroid of the object is depicted by such pixel. Additionally, the model can include a second head configured to generate a plurality of distance fields, each distance field providing a respective distance value for each of the plurality of pixels, the respective distance value indicating a distance from each pixel to one of a plurality of vertices associated with a bounding box for the object. Outputs generated by the first head and the second head can then be used, at least in part, to determine 3D coordinates for the bounding box associated with the object depicted in the 2D image. Thus, generally implementations can include providing image data to a machine-learned object detection model configured to determine outputs that can be used to map a two-dimensional coordinate system to higher dimensions.

More particularly, various systems and methods can be used to obtain the two-dimensional image that includes an object. For instance, a camera can be accessed on a local device (e.g., a smartphone) to take a photograph or video of an object. Alternatively or additionally, a system may execute instructions to access memory, ether local or remote (e.g., stored in the cloud), that contains data for the two-dimensional image. Thus, obtaining a two-dimensional image can generally include accessing data associated with two-dimensional imagery or acquiring the data using a device in communication with the system.

Further, in some implementations aspects of providing the image to a machine-learned object detection model can be based on how the two-dimensional image was obtained. For example, in certain implementations object detection can be performed in substantially real-time. For these scenarios, an API associated with the object detection model or other devices and/or sensors in communication with the computing system may include instructions for accessing the devices and/or sensors to transmit image data directly to the object detection model. In this manner, the computing system can directly provide the sensor information (e.g., video stream) to the machine-learned object detection model without requiring any external input. Alternatively, certain implementations may include an interface configured to receive a user interaction such as defining a file path or selecting an image file to determine the image to provide to the object detection model.

Aspects of image processing performed by the machine-learned object detection model can include an architecture defining a plurality of heads. In general, machine-learned object detection models according to the present disclosure can include at least two heads. As an example, a first head can be configured to generate a centroid heat map, which can provide a respective heat value for each of the plurality of pixels. More particularly, the respective heat value for each pixel describes a probability that a centroid of the object is depicted by such pixel. As another example, a second head can be configured to generate a plurality of distance fields. Each distance field can provide a respective distance value for each of the plurality of pixels. More particularly, the respective distance value for each pixel can indicate a distance from the pixel to one of a plurality of vertices associated with a bounding box for the object.

In some implementations, the machine-learned object detection model can include a third head configured to generate a segmentation mask for the image. Aspects of the segmentation mask can include data providing a binary response (e.g., a label) for each pixel in the plurality of pixels indicating each pixel as associated with either background or the object. In the case of multiple objects, the segmentation mask may be configured to determine a multi-label response, associating each object with a separate value (e.g., 1, 2, 3, 4, etc.) and the background with a unique label (e.g., 0). In certain implementations, the third head can be configured to generate a segmentation mask that groups similar objects with the same label. For example, an image may include multiple instances of objects such as shoes and/or chairs. In determining the segmentation mask, certain systems may be configured to determine a different label for each object depicted in the image (e.g., each instance of the shoe would be assigned a different label). Alternatively, the segmentation can group or may be configured to group objects having similar characteristics (e.g., shoes) with the same label. In this manner, the segmentation mask can provide a means for differentiating objects having close proximity and may yield improved accuracy for certain object detection tasks.

Another example aspect of the machine-learned object detection model can include a encoder-decoder backbone configured to map the 2D image into a different dimensional space prior to performing one or more learning tasks and map the results of the one or more learning tasks to a another dimensional space to extract output of the plurality of heads. The different dimensional space can be a lower dimensional space and may convert the image data to a different format which can improve the efficiency of certain implementations such as by reducing memory consumption or utilizing a data format that has reduced computing requirements. In this manner, some implementations may demonstrate substantially real-time performance, such as having less than 1 second delay (e.g., less than about 500 ms, 400 ms, 300 ms, 200 ms, 100 ms, 50 ms, or 5 ms) between image acquisition and model output generation.

In certain implementations, the machine-learned object detection model can be in further communication with other machine-learned models or data operations for mapping model output to determine values for defining a three-dimensional bounding box. For instance, aspects of the model output such as the centroid heat maps and the distance fields can be used to identify vertex coordinates in 2 dimensions. As one example, a vertex identification model can be used to predict locations for the vertices of a three-dimensional bounding box. The three-dimensional bounding box can have any number of vertices, but for illustration, assuming the three-dimensional bounding box represents a rectangular prism, the vertex identification model predicts locations of 8 vertices. Based at least in part on the centroid heat maps and the distance fields, the vertex identification model can generate 2D-coordinates (e.g., x, y-coordinates) for each vertex of the bounding box such as 8 pairs of coordinates for a rectangular prism.

Additionally, a 3D mapping model or function can be coupled with the vertex identification model (e.g., using sequential processing or trained as an additional output or head) to determine 3D-coordinates for each vertex of the bounding box. Since the 2D image lacks depth information, the system is underspecified for determining a third spatial dimension. To account for this, the 3D mapping model can also receive camera intrinsics such as focal length, principal point, image sensor format, scale factors, etc. to estimate attributes such as the object size and pose. These attributes can be derived from output of the 3D mapping model. Example, output of the 3D mapping model can include an additional dimension used to assign 3D-coordinates (e.g., x, y, z-coordinates) to each vertex.

In some implementations, another model or function can be used to extrapolate a physical scale based at least in part on the 3D-coordinates. Scale information may be obtained from various sources including camera data. As one example, scale information can be included in augmented reality data associated with the image or the scene depicted in the image. The augmented reality data can include a depth map which can be generated from a point cloud mesh of the scene using various camera poses, scanning systems, or other processing using an augmented reality engine. Augmented reality data such as detected surfaces and/or ground planes can be obtained by the scale extrapolation model to estimate physical values for the bounding box such as vertex values in metric units (e.g., meters), English units (e.g., feet), or SI units (e.g., centimeters).

Based on the object detection model architecture, determining the dataset comprising 3D coordinates for the bounding box can include: identifying the centroid of the object based at least in part on the centroid heat map, applying a voting scheme on the plurality of distance fields to identify a plurality of 2D projections of the vertices of the bounding box in the 2D image, and reconstructing the 3D coordinates for defining the bounding box from the plurality of 2D projections of the vertices.

One example for determining the centroid of the object can include identifying the maximum heat and/or another statistical value representing a high probability that the pixel location is associated with the centroid of the object. Since images can include multiple objects, multiple centroids can be identified based on the heat values (e.g., based on a gradient of heat values or other distribution surrounding each separate object).

Further, aspects of determining the dataset comprising 3D coordinates may include a combination of selected features from the centroid heat map and/or the plurality of distance fields. For example, the heat of each pixel from the centroid heat map, may be used to weight the voting scheme used to determine the vertices of the bounding box. Further, for images that include multiple objects, the voting scheme can be configured to ignore or decrease the weight of votes that are outside of a neighborhood (e.g., within 10 pixels of a centroid).

In general, the 2D projections of the vertices of the bounding box provide two dimensional coordinates (e.g., x, y-coordinates) for vertices of a 3D bounding box. The third dimensional coordinate (e.g., z-coordinate) can be reconstructed from the vertices of the 2D bounding box utilizing example models such as the EPnP algorithm also referred to as the perspective-n-point algorithm.

Additionally, one aspect of certain implementations can include identifying an object category. The object category can be used to define which face (e.g., which vertex coordinates) of the bounding box is up, which face is front, or other combinations designating the relative position of two or more faces of the bounding box. Further, in some cases, each instance of an object in this category can be assigned the same canonical coordinates.

Example Model Architecture

Figure 2A:
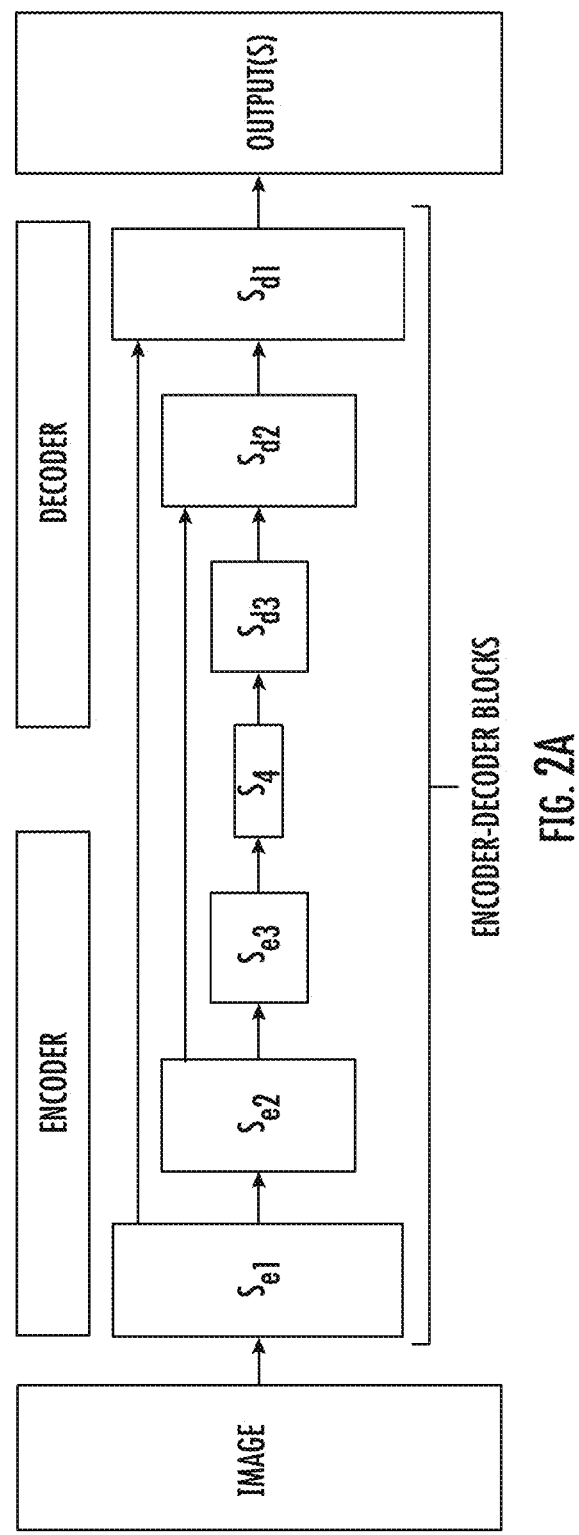
FIG. 2A illustrates an example model architecture displaying an encoder-decoder network to generate output(s) according to example implementations of the present disclosure.

As an example for illustration, the machine-learned object detection model also referred to as 9DD-Net can be a fully convolutional network with multi-task learning. The input size can be configured to work with a variety of image types. As one example, a two-dimensional size and color vector can be used such as 640×480×3. The input image can go through a 2D convolution with having a certain stride (e.g., stride 4), and then to encoder-decoder blocks that can each include skip connections. FIG. 2A depicts one example of such a machine-learned object detection model. As depicted in FIG. 2A, each encoder-decoder block in the figure can represent several residual blocks. The residual blocks can be based on depth wise separable convolutions followed by 1×1 convolution layers which can be used in certain implementations to improve real-time performance on device. Compared to other networks, the example model can be implemented as a single stack but can be deepened by the number of residual blocks. Through the network, one or a mixture of activation layers can be used. For example, Parametric Rectified Linear Unit (PReLU) can be used for some or all activation layers.

Figure 2B:
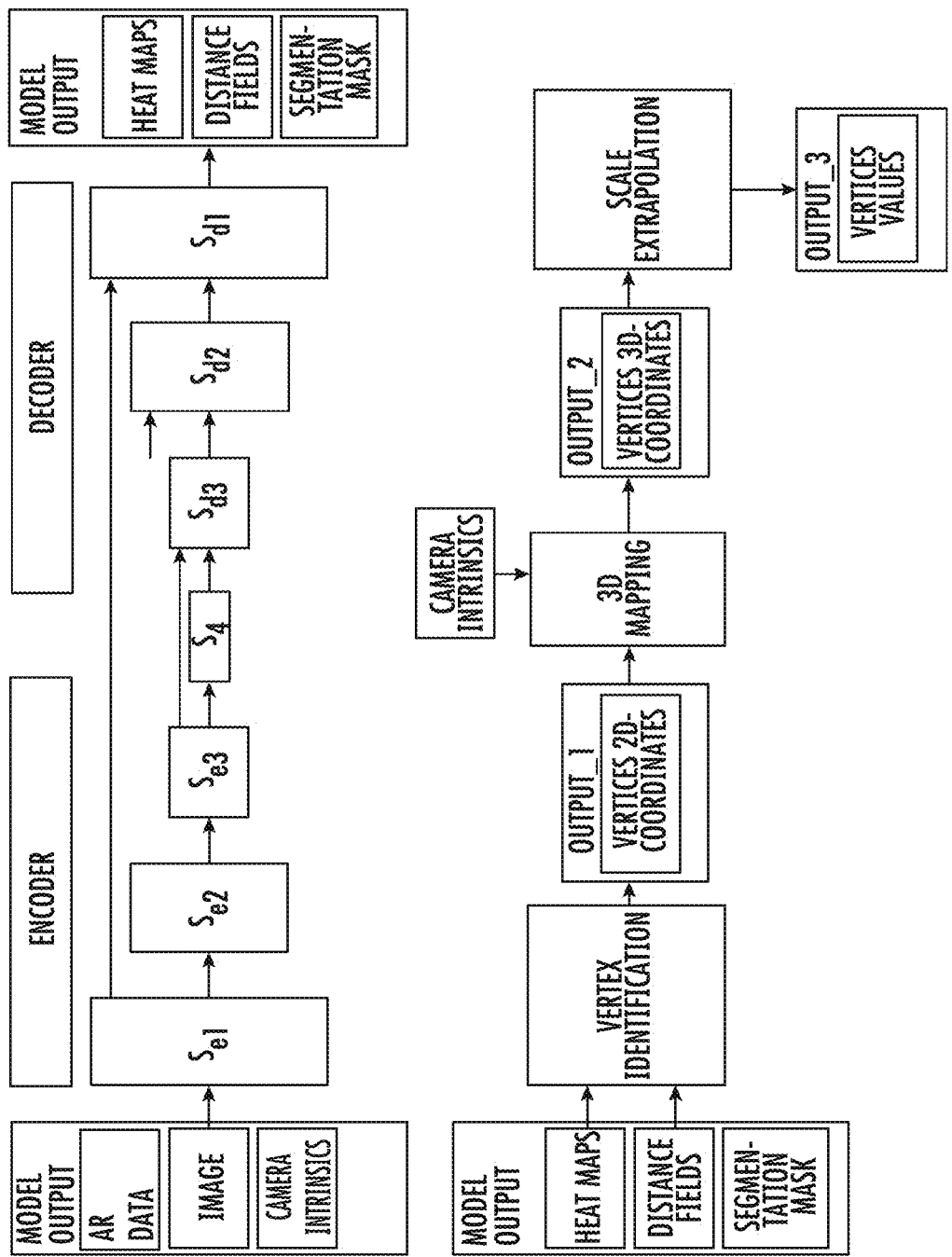
FIG. 2B illustrates another example model architecture in accordance with example implementations of the present disclosure.

The 9DD-Net can be configured to perform multiple tasks in a single shot. For example, as illustrated in FIG. 2, the 9DD-Net can include three heads configured to generate: a) centroid heatmap, b) distance field, and c) semantic segmentation. The shape of the centroid heatmap can be varied but may be defined based on the image size such as a quarter of the image size (160×120), with each pixel representing the probability of an object centroid. The distance field can be a (160×120×16) tensor, each being the X or Y distance of the box's eight vertices (in two dimensions) relative to the pixel location. Hence the tensor size can be determined at least in part based on the number of vertices (e.g., 8 for a rectangular prism) and the number of dimensions (e.g., 2) to yield the tensor attribute (e.g., 16). Multiple objects can be placed into the same channel, with the benefit of the outputs being independent of the number of objects. In the example shown in FIG. 2A, the image contains two shoes. Hence, the heatmap has two centroids, and each distance field has two sources. Finally, the network can also output a segmentation mask for all objects. Though not required in additional processing, the segmentation head can help the network detect the complete shape of an object, and therefore can improve estimation of object pose and size.

A heatmap configured to predict object heats can be used for detecting objects' centroids in the image plane. For instance, for a pixel p in an image, its heat can be computed as a bivariate normal distribution as shown in Eq. 1.

$$h(p) = \max_{i \in O}(\mathcal{N}(p - c_i, \sigma_i)), \quad \text{Eq. (1)}$$

where $\mathcal{I}$ is the image, p denotes each 2D pixel in the image, $\mathcal{O}$ is the set of all object instances visible in the image $\mathcal{I}$, i is the index of the object, $c_i$ is the centroid's 2D projection for object i, and $\sigma_i$ is the kernel size. For multiple objects in an image, the max heat can be set as the value at each pixel.

Unlike other models such as CenterNet which uses a modified focal loss, a mean square error (MSE) loss can be implemented for the heatmap head, and thus, make the mathematical solution a regression problem. Additionally, the heat kernels can be dynamic to object size, so positive and negative examples (pixels with significant and near-zero heats) are generally balanced. For multiple categories, CenterNet uses multiple channels in heatmap. While this can also apply to the 9DD-net, 9DD-net can be configured to use a single channel for a small number (e.g., three) of categories. The consideration is that larger models and outputs will consume more on-device resources and run slower on mobile compared to 9DD-net. Thus, a benefit of some implementations including the example 9DD-net is the ability to run on-device in substantially real time.

Instead of using heatmaps to predict all features the 9DD-net can be configured to determine distance fields to each vertex. Specifically, for a box vertex $X_i$, let $x_i$ denote its projection on image plane. The example 9DD-net can use fractions for projections to preserve accuracy. One example method for computing the displacement vector of its distance field is shown in Eq. 2.

$$d_i(p) = x_i - p. \quad \text{Eq. (2)}$$
$$p \in \mathcal{I}$$

Distance fields of multiple objects in an image can be merged according to their heats. For instance, two losses can be computed for the distance field head. One is a masked MSE (M−MSE) loss between prediction and ground truth. The mask is computed based on the heatmap, such that only the loss at pixels with significant (e.g., >0.2) heats need to be computed. The other is a smoothness loss. Since the distance fields have constant gradients, a loss can be defined as the M−MSE between gradients of predicted distance fields and constant δ. With that, one example method for defining the distance field loss is as shown in Eq. 3.

$$L_d = M\text{-MSE}(d) + w \cdot M\text{-MSE}(\nabla d - \delta), \qquad \text{Eq. (3)}$$

where δ=1 in this case, w is the weight of smoothness loss, ∇ is the gradient operator, and ∇d is the gradient image of the distance fields can be determined as shown in Eq. 4.

$$\nabla d = \left[\frac{\partial d}{\partial x}, \frac{\partial d}{\partial y}\right]^T, \qquad \text{Eq. (4)}$$

Segmentation can help in pose estimation by learning object boundaries. Therefore, in the example 9DD-net a segmentation head is included to have the network learn multiple tasks simultaneously. Standard IoU loss can be used for this head and it can be optional for training data without segmentation labels. The loss computation also allows training on data with mixed conditions. That is, within a batch, the loss is computed only on images with segmentation labels.

With the network output, 2D projections of underlying 3D bounding boxes can be determined. Using the distance fields, all pixels with significant responses in heatmaps can contribute to computing vertex coordinates. For instance, a voting strategy can be used to obtain the final estimate. For a pixel p, its vote to vertex $v_i$ can be computed as shown in Eq. 5.

$$\text{vote}_i(p) = p + d_i(p), \qquad \text{Eq. (5)}$$

weighted by the heat of this pixel.

Peaks (e.g., maxima or other extrema heats) can be located in a heatmap, and voting occur within the vicinity of a peak location. The vicinity size can be computed by fitting Gaussian kernels on the heatmap. Here we set it as constant (20 pixels) for simplicity. Considering there are often multiple objects in an image, we ignore outlier votes with distances over 10 pixels from the peak's vote. The estimation of the 2D projection of vertex i is computed as the weighted average of valid votes as shown in Eq. 6.

$$x_i = \frac{\sum_{p \in \mathcal{J}} h(p) \cdot \text{vote}_i(p)}{\sum_{p \in \mathcal{J}} h(p)}, \qquad \text{Eq. 6}$$

Given the projected 2D box vertices and the camera intrinsics (e.g., from AR session data), a function such as the EPnP algorithm can be used to recover a 3D bounding box up to scale. The EPnP algorithm takes n control points. The first control point can be the origin (at object's coordinate system). Furthermore, three more control points can be selected along the object's axis system. These control points can be used to form an orthogonal basis for the object. The bounding boxes eight vertices can be represented by these four control points.

Next the EPnP solver given 16 constraints from the detected 2D vertices (8 vertices for a rectangular prism, each having 2 independent coordinates) and four control points to build a linear system. For perspective cameras, the linear system is determined and has a unique solution. Solving this linear system gives a solution that can generate a bounding box with scale ambiguity. To guarantee the estimated control points form an orthogonal basis, some implementations of the 9DD-net can solve the problem of nearest orthogonal matrix using singular value decomposition (SVD).

The solution can generate a bounding box with scale ambiguity. The output can be applied to estimate the object's size and pose from the control points up to scale. The size can be extracted using the distance of the last three control points from the box's center (the first control point). Given the vertices X and the size Ŝ, the object's orientation R and translation T̂ can be estimated by solving the equation R·Ŝ·B+T̂=X, where B is the unit box. Rotation R is scale invariant. This result is sufficient for a number of applications such as determining the viewpoint. Composed by two polar angles: azimuth and elevation, the viewpoint is scale invariant. Hence, viewpoint can be used as a metric to evaluate 9 DoF detection up to a scale.

Extra information is needed to resolve the scale ambiguity. For example, in literature, object size, object depth, and multiple views have been used to resolve this ambiguity. Generally, the example method can be combined with any of these approaches. Another approach developed for implementations of 9DD-net can use detected planes or other information from AR session data to determine scale information.

For instance, given the normal n (e.g., as detected using AR session data) and a known point p on a plane, any vertex $X_i$ on the plane is subject to the constraint as shown in Eq. 7.

$$(X_i - p) \cdot n = 0, \qquad \text{Eq. (7)}$$

With this, the scale can be determined as shown in Eq. 8.

$$\beta = \frac{p \cdot n}{X_i \cdot n}, \text{ with } \beta > 0, \qquad \text{Eq. (8)}$$

As one example, the 9DD-net can be configured to ensure β is positive, by choosing 3D point X with negative depth (z) values, the object is always in front of the camera. Further, assuming the object is on a planar surface, the four bottom vertices of its 3D bounding box are subject to Eq. 7. Four vertices with smallest projections to the plane normal $\hat{X}_i \cdot n$, can be selected and the mean of their scales computed by Eq. 8 to determine the metric scale.

Example Devices and Systems

FIG. 1A depicts a block diagram of an example computing system 100 that can store or transmit information such as machine-learned models 120 or 140 according to example aspects of the present disclosure. In one example implementation, the system 100 can include a user computing device 102 and a server computing system 130 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 can include one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include the machine-learned model(s) such as object detection models having model architectures according to example implementations of the present disclosure.

In certain implementations, the machine learned model(s) 120 can be received from the server computing system 130 over network 180, stored in the user computing device memory 114, and then used or otherwise implemented by the one or more processors 112. In some implementations, the user computing device 102 can implement multiple parallel instances of a single machine-learned model (e.g., to perform parallel object detection such as parallel generation of 3D bounding box coordinates for real-time image processing such as in video streams and/or to perform parallel object detection in a single image or different regions of a single image).

Additionally or alternatively, the machine-learned model(s) 120 can be included in or otherwise stored and implemented by the server computing system 130 that communicates with the user computing device 102 according to a client-server relationship. For example, the machine-learned model(s) 140 can be implemented by the server computing system 130 as a portion of a web service. Thus, the machine-learned model(s) 120 can be stored and implemented at the user computing device 102 and/or machine learned model(s) 140 can be stored and implemented at the server computing system 130. Since, in some implementations, the machine learned models can include a first model such as an object detection model including a plurality of heads, a second, separate model and/or computer algorithm can be configured to receive output(s) from the first model and generate object detection features such as vertices for a three-dimensional bounding box in at least two dimensions. For example, a vertex identification model or algorithm can receive information such as the heat maps and distance fields generated by the object detection model to generate 2D-coordinates (e.g., x, y-coordinates) for each of the vertices of a 3D bounding box. These 2D-coordinates can be received by a 3D mapping model configured to determine coordinates in a third dimension (e.g., z-coordinates) to determine 3D-coordinates for the 3D bounding box. Thus generally, the machine-learned models 120 and/or 140 can include object detection models, other machine-learned models and/or algorithms for processing output(s) of the object detection model. For performing object detection and/or 3D bounding box generation, each of these machine-learned model(s) and/or algorithms can be individually accessed and/or transmitted between the user computing device 102 and the server computing system 130. Alternatively, the machine-learned model(s) and/or algorithms can be included in a single architecture that can be included as part of memory 114 on the user computing device 102, on memory 134 included on the server computing system 130, or both. For instance, including all of the machine-learned model(s) and/or on a single device may improve efficiency by reducing the need for data transmission between the user computing device 102 and the server computing system 130. Which can improve performance for applications involving real-time object detection.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard, user interface, or other tool for receiving a user interaction. Other example user input components include a microphone, a camera, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include machine learned model(s) 140. Example machine-learned models include neural networks or other multi-layer non-linear models. Example neural networks include feed forward neural networks, deep neural networks, recurrent neural networks, and convolutional neural networks.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1A illustrates one example computing system that can be used to implement the present disclosure. Other computing systems can be used as well.

Figure 1B:
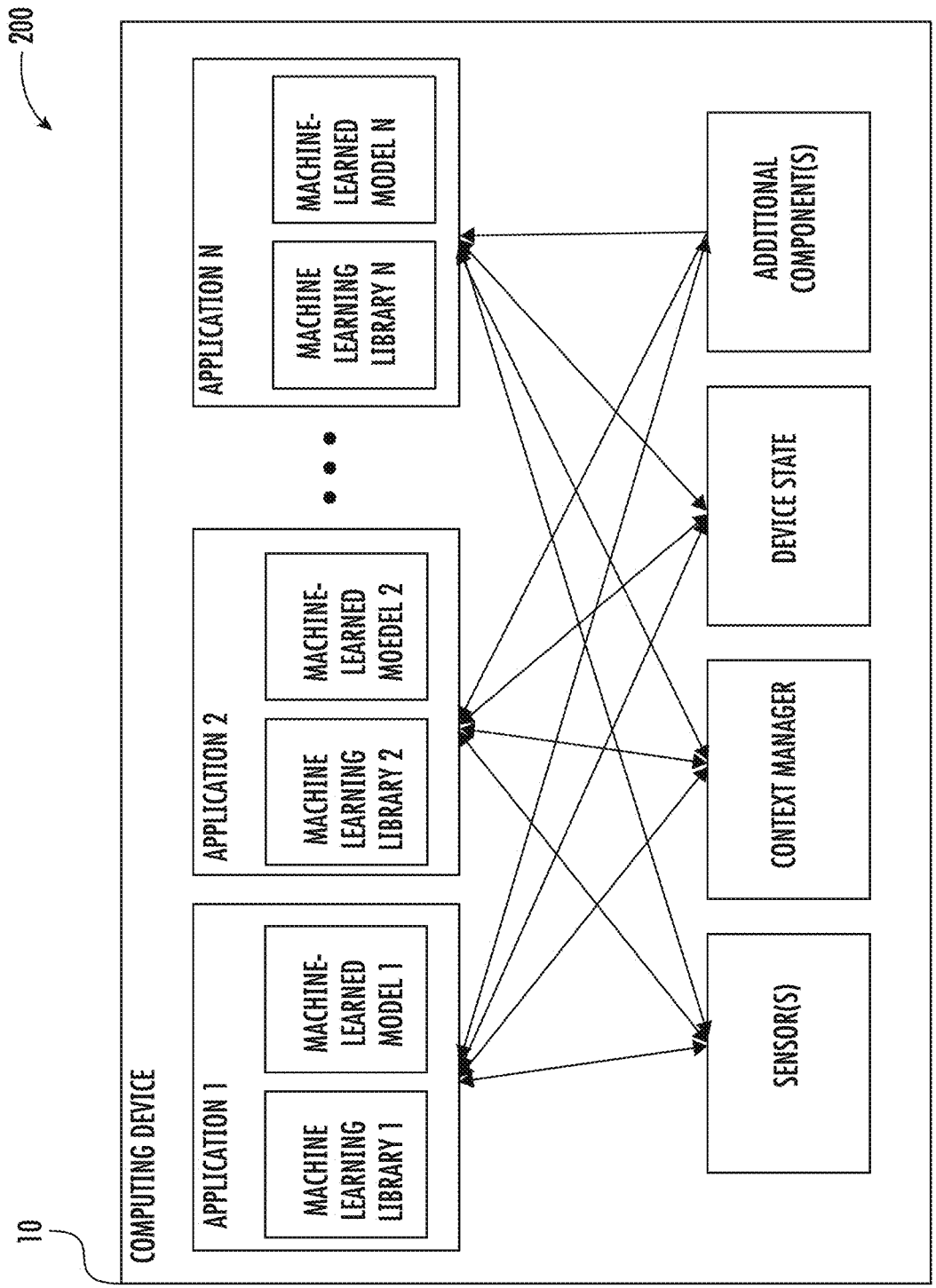
FIG. 1B illustrates an example computing device including one or more machine-learned models(s) in accordance with example implementations of the present disclosure.

FIG. 1B illustrates an example computing device 10 including one or more machine-learned models in accordance with the present disclosure. Each of these machine-learned model(s) can be associated with an application such as object detection, labeling, object recognition, or other similar functions described herein. Each machine-learned model can be trained using a machine learning library that can include labeled data for performing supervised training tasks. As one example, one machine-learned model may be configured to determine heats for generating a heatmap of each pixel in an image, the heats determined based on proximity to a centroid of the object. This machine learning library can include images that have been labeled with object location(s), bounding box coordinates, segmentation masks or other features learned by example machine-learned models. Further the machine learning library can include synthetic data that can be produced using an augmented reality engine. For example, an augmented reality engine can be used to place a virtual object (e.g., data derived from an object scanned using a 3D scanner) in an augmented reality scene (e.g., a scene generated using an AR engine that can include depth maps of locations in the scene as well as multiple camera poses and views). In this manner, the machine learning library can include synthetic data generated using real scenes and objects that are constructed using an AR engine that can more precisely label coordinate locations and object poses within the scene compared to real data. However, it should be understood that not all of the data in the machine learning libraries is limited to synthetic data. Real images labeled using machine learning software or by humans can be included in the machine learning libraries.

In certain implementations the machine-learned model(s) and/or algorithms can be in communication with other components of the computing device such as sensor(s) (e.g., a camera), a context manager, a device state, or other additional components. For instance, an API can be configured to support communication between a device component such as a camera so that data can be directly sent to the machine-learned model(s) for object detection such as generating 3D bounding boxes with vertices having 3D-coordinates in substantially real-time.

Figure 1C:
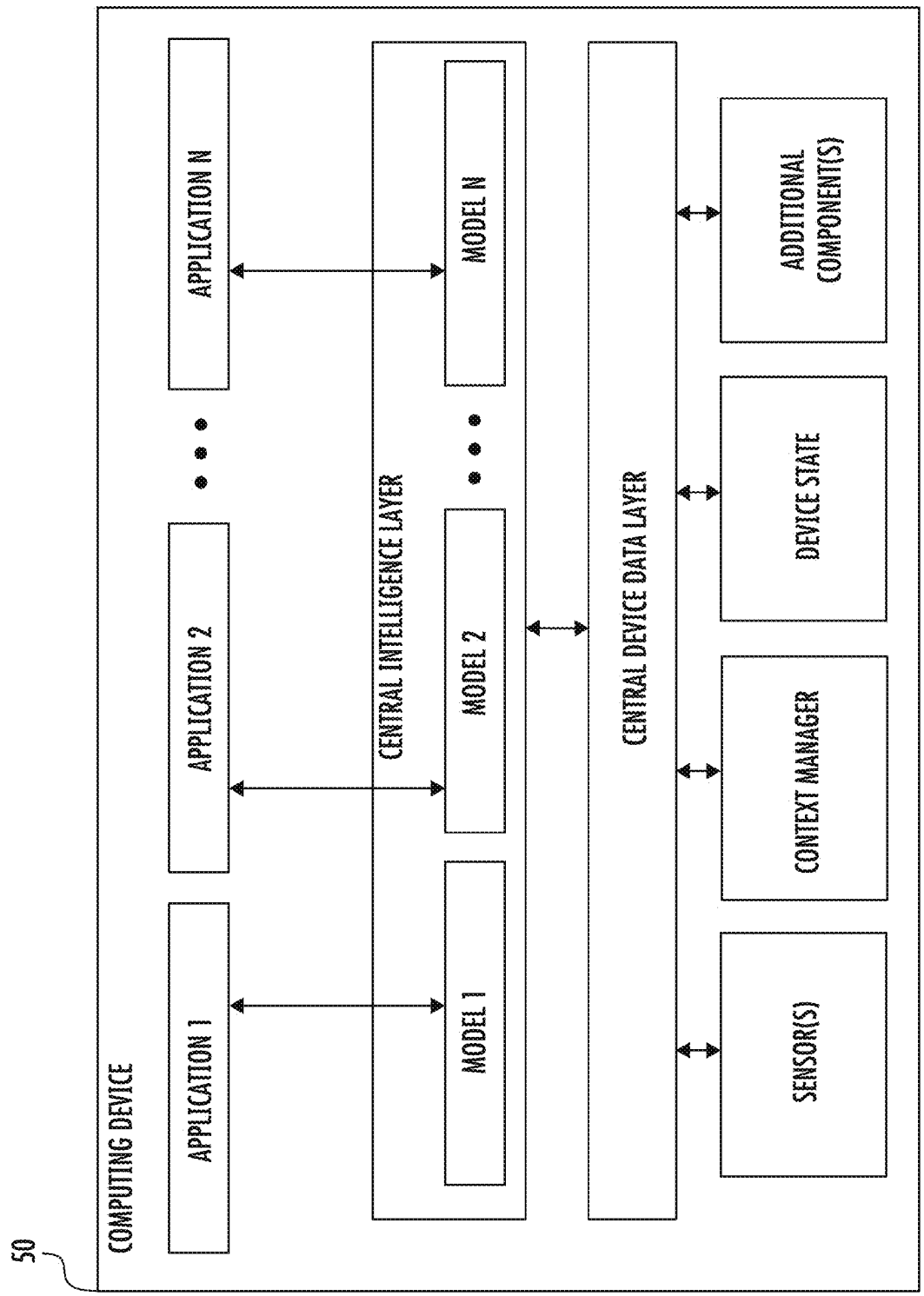
FIG. 1C illustrates another example computing device including one or more machine-learned model(s) in accordance with example implementations of the present disclosure.

FIG. 1C illustrates another example computing device 50. The example computing device 50 can include one or more machine-learned models object detection or other computer vision tasks according to example implementations of the present disclosure.

Example Architectures

FIG. 2C illustrates an example model architecture including example model input(s) and output(s). As shown, certain model inputs can be provided to an encoder-decoder backbone. The encoder-decoder backbone can include a sequence of transformations for modifying the dimensionality of input data (e.g., an image) in addition to determining model outputs. Example model outputs can include heat maps (e.g., for identifying the centroid(s) of object(s) depicted in the image), distance fields (e.g., for determining pixel distance(s) to vertex coordinates), and segmentation maps (e.g., for labeling object boundaries). Using separate models and/or algorithms, the model output(s) can be processed using a vertex identification model to determine coordinates for the vertices of a 3D bounding box in two dimensions (e.g., x, y-coordinates for each vertex)). To obtain relative information about a third spatial dimension, additional information such as camera intrinsics can be provided to 3D mapping function in combination with the vertices 2D-coordinates to determine vertices 3D-coordinates describing the vertices of a 3D bounding box in three dimensions (e.g., x, y, z-coordinates for each vertex). These coordinates can be scale independent but provide enough information to determine the object(s) relative size and pose. To determine a physical scale and additional model can be included for extrapolating physical scale. For example, depth information or planar surfaces that can be detected using augmented reality (AR) data can be provided to a model or algorithm for scale extrapolation configured to determine output such as vertices values in a physical scale (e.g., meters) for each of the bounding box vertices in three dimensions.

Example Model Output and Modified Image

Figure 3A:
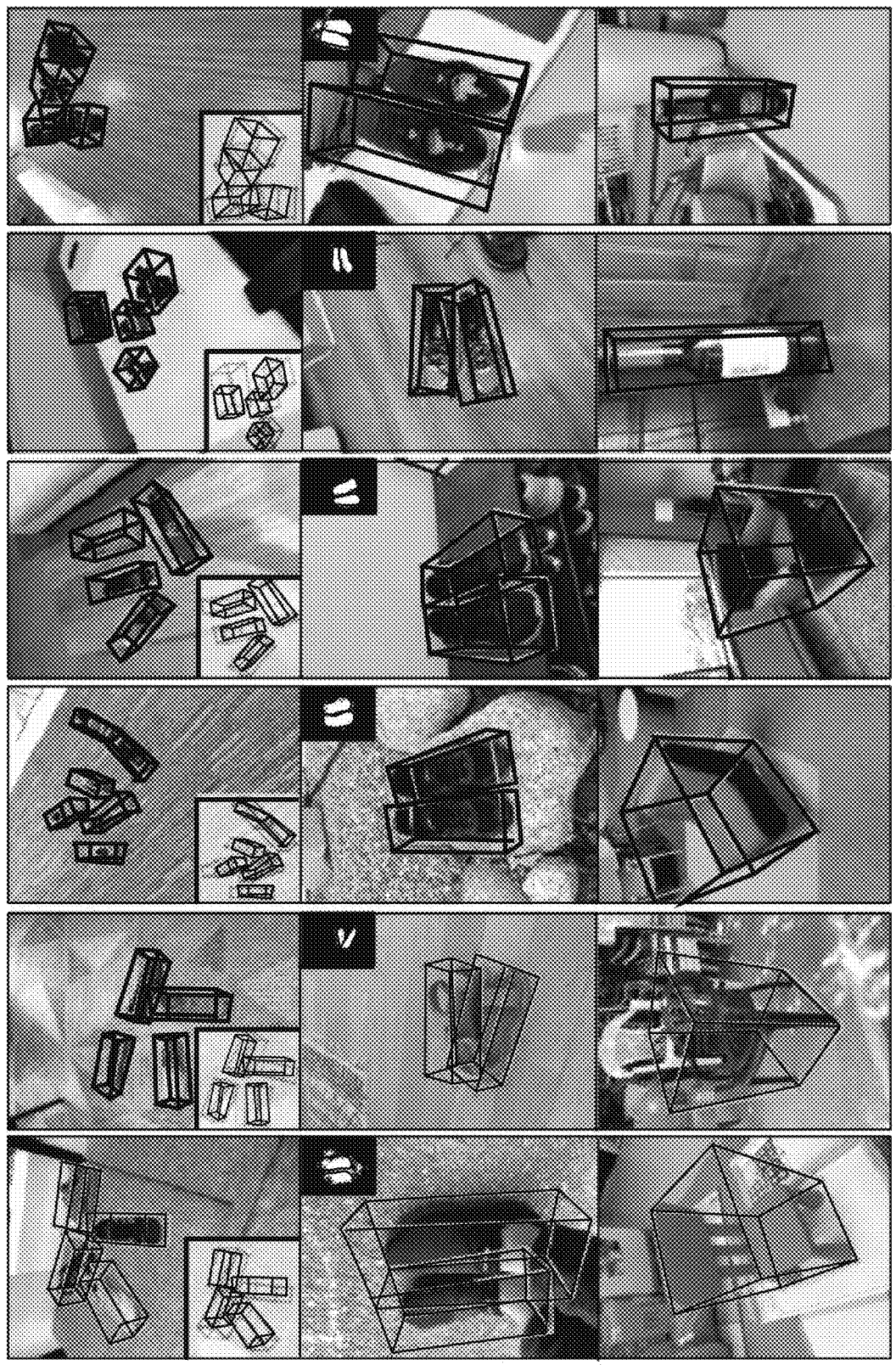
FIGS. 3A and 3B illustrate example outputs derived from example implementations according to the present disclosure. These figures include multiple images depicting 3D bounding boxes surrounding various objects.
Figure 3B:
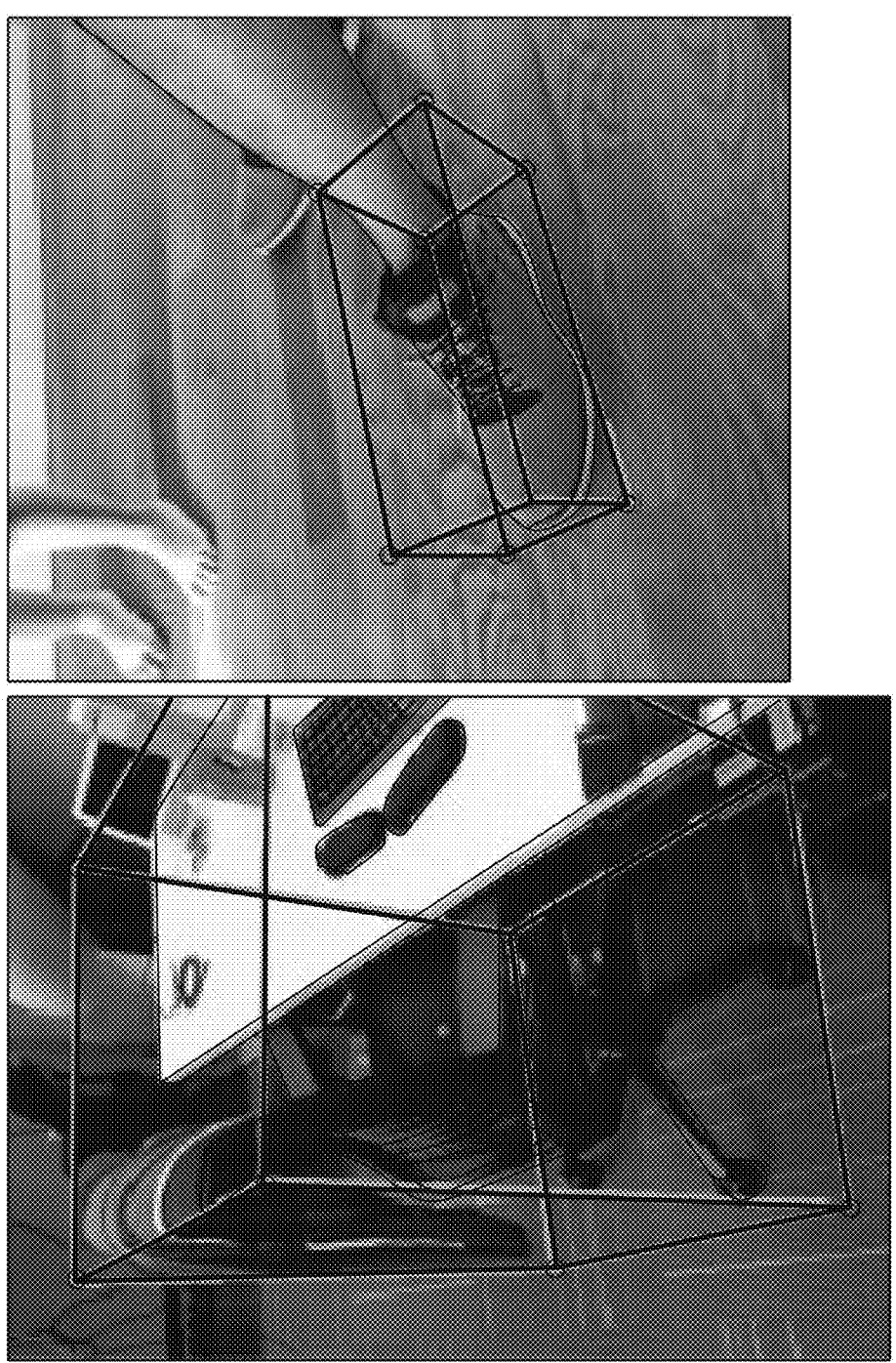

FIGS. 3A and 3B depict example model outputs illustrating the image overlaid with one or more example model outputs. For instance, FIG. 3A depicts 18 images used to perform object detection using example implementations according to the present disclosure. In FIG. 3A, the top row of images are overlaid with 3D bounding boxes. Further an inset is displayed in the lower left corner displaying the bounding box locations with background masked. The middle row in FIG. 3A also includes images overplayed with 3D bounding boxes. The middle row of images also includes a segmentation mask displaying another example output of certain implementations. The bottom row in FIG. 3A displays object detection for objects other than shoes such as chairs and bottles. Again these images are overlaid with 3D bounding boxes generated using example implementations according to the present disclosure. Further the images depicted in FIG. 3A illustrate the capability of example models to distinguish objects for scenes including more than one object.

Example Methods

Figure 4:
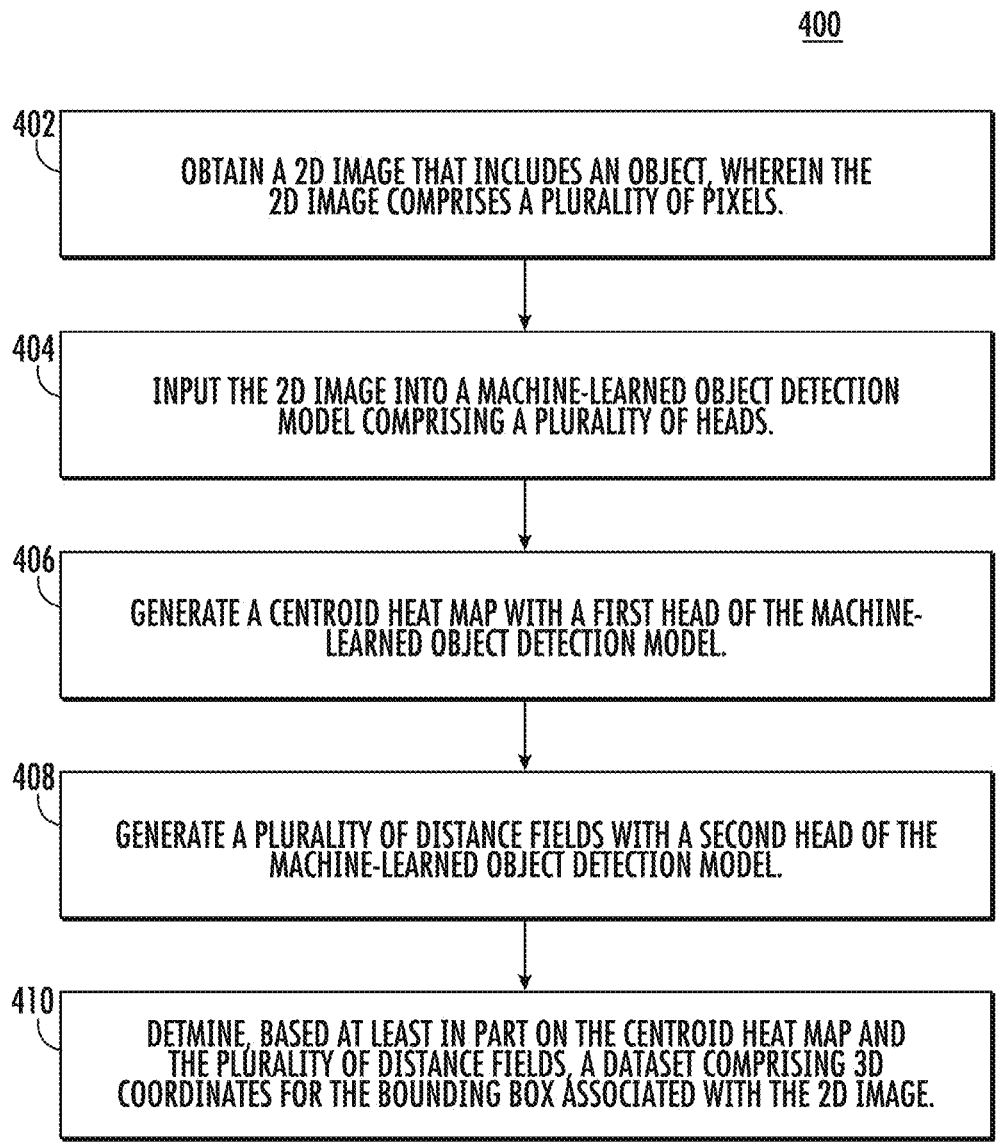
FIG. 4 illustrates a flow diagram depicting an example method for performing object detection according to example implementations of the present disclosure.

FIG. 4 depicts a flow chart diagram of an example method to perform object detection and/or recognition according to example implementations of the present disclosure. Although FIG. 3 depicts steps performed in a particular order for purposes of illustration and discussion, the methods of the present disclosure are not limited to the particularly illustrated order or arrangement. The various steps of the method 400 can be omitted, rearranged, combined, and/or adapted in various ways without deviating from the scope of the present disclosure.

At 402, a computing system can obtain a 2D image that includes an object, the 2D image including a plurality of pixels. Obtaining the 2D image can include accessing a database of stored data, generating an image using a device such as a camera that can be included in the computing system or that can be in communication with the computing system.

At 404, the computing system can input the 2D image into a machine-learned object detection model that includes a plurality of heads. One aspect of the machine-learned model can include a first head configured to generate a centroid heat map that provides a respective heat value for each pixel in the image. The respective heat value for each pixel describing a probability that a centroid of the object is depicted by such pixel. Another aspect of the machine-learned model can include a second head configured to generate a plurality of distance fields, each distance field providing a respective distance value for each pixel in the image. The respective distance value for each pixel indicating a distance to one of a plurality of vertices associated with a bounding box for the object. As an example for illustration, a machine-learned model can be configured to determine vertices for a 3D bounding box having the shape of a rectangular prism. The rectangular prism defines 8 vertices and the distance fields can be configured to predict a coordinate distance to each of the vertices for each spatial dimension in the 2D image (e.g., the x-dimension and y-dimension).

At 406, the computing system can generate a centroid heat map with a first head of the machine-learned object detection model. Aspects of generating the centroid heat map can include assigning a heat value to each pixel. Assigning the heat values can be determined using a bivariate normal distribution. Further, the first heat can be configured to use mean square error loss for determining the heat values.

At 408, the computing system can generate a plurality of distance fields with a second head of the machine-learned object detection model. In the case of multiple objects in one image or multiple centroids, the distance fields of each object can be merged according to their heats. In determining the distance fields, example models can be configured to determine one or more loss functions. For instance, a masked loss can be defined as the loss between prediction and ground truth. In an example implementation, the mask can be determined based on the heatmap. Another loss function can include a smoothness loss. For example, the model can be configured to assume constant gradients for the distance fields and a weighting applied to the masked mean squared error determined based at least in part on the gradient of the distance fields.

At 410, the computing system can determine, based at least in part on the centroid heat map and the plurality of distance fields, a dataset comprising 3D coordinates for the bounding box associated with the 2D image. For instance, the example implementations can be configured to determine vertex coordinates for a 3D bounding box. In certain implementations these vertex coordinates can be in two dimensions (e.g., x, y-coordinates). In some implementations, additional data such as camera intrinsics, can be included in the machine-learned model or another model or algorithm can use the camera intrinsics and the 2D vertex coordinates to determine vertex coordinates in three dimensions (e.g., x, y, z-coordinates) for each vertex.

From at least the combination of operations described in FIG. 3, computing systems according to the present disclosure can perform 3D object detection using 2D imagery that in certain implementations can be combined with additional data such as camera intrinsics and/or AR data.

Additional Disclosure

The technology discussed herein makes reference to servers, databases, software applications, and other computer-based systems, as well as actions taken, and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for three-dimensional (3D) object detection in two-dimensional (2D) images, the method comprising:
    obtaining, by one or more computing devices, a 2D image that includes an object, wherein the 2D image comprises a plurality of pixels;
    inputting, by the one or more computing devices, the 2D image into a machine-learned object detection model comprising a plurality of heads, wherein the plurality of heads comprise:
        a first head configured to generate a centroid heat map, wherein the centroid heat map provides a respective heat value for each of the plurality of pixels, and wherein the respective heat value for each pixel describes a probability that a centroid of the object is depicted by such pixel; and
        a second head configured to generate a plurality of distance fields, wherein each distance field provides a respective distance value for each of contributing pixels of the plurality of pixels, and wherein the respective distance value for each pixel of the contributing pixels of the plurality of pixels indicates a distance to one of a plurality of vertices associated with a bounding box for the object, wherein each distance field provides the respective distance value for each of the contributing pixels of the plurality of pixels that has a heat value above a predetermined value;
    generating, by the one or more computing devices, the centroid heat map with the first head of the machine-learned object detection model;
    generating, by the one or more computing devices, the plurality of distance fields with the second head of the machine-learned object detection model; and
    determining, by the one or more computing devices and based at least in part on the centroid heat map and the plurality of distance fields, a dataset comprising 3D coordinates for the bounding box associated with the object in the 2D image.

2. The computer-implemented method of claim 1, wherein
    determining, by the one or more computing devices and based at least in part on the centroid heat map and the plurality of distance fields, the dataset comprising the 3D coordinates for the bounding box comprises:
        identifying, by the one or more computing devices, the centroid of the object based at least in part on the centroid heat map;
        applying, by the one or more computing devices, a voting scheme on the plurality of distance fields to identify a plurality of 2D projections of the vertices of the bounding box in the 2D image; and
        reconstructing, by the one or more computing devices, the 3D coordinates for defining the bounding box from the plurality of 2D projections of the vertices.

3. The computer-implemented method of claim 1, wherein the plurality of heads further comprise:
    a third head configured to generate a segmentation mask the object, wherein the segmentation mask provides a binary response for each pixel in the plurality of pixels indicating each pixel as associated with either background or the object.

4. The computer-implemented method of claim 1, wherein the respective heat value for each of the plurality of pixels is determined using a bivariate normal distribution.

5. The computer-implemented method of claim 1, wherein generating the plurality of distance fields is based at least in part on the respective heat value for each of the plurality of pixels.

6. The computer-implemented method of claim 1, wherein the dataset comprises x, y, z-coordinates for each vertex in the plurality of vertices.

7. The computer-implemented method of claim 6, wherein the x, y, z-coordinates for each vertex in the plurality of vertices define one or more of: a 3D location of the object, an object orientation, and an object size.

8. The computer-implemented method of claim 1, further comprising:
acquiring, by the one or more computing devices, one or more camera intrinsics associated with the 2D image, augmented reality data associated with the 2D image, or a combination, and wherein determining the 3-D coordinates comprises generating a physical scale based at least in part on the augmented reality data associated with the 2D data, the one or more camera intrinsics, or both.

9. The computer-implemented method of claim 1, wherein the machine-learned object detection model is trained using the dataset comprising:
one or more augmented images, wherein, optionally, at least one augmented image in the one or more augmented images includes a segmentation label defining each pixel in the one augmented image as either background or associated with the object, and wherein each augmented image is generated using an augmented reality engine.

10. The computer-implemented method of claim 1, wherein generating each augmented image comprises:
obtaining, by one or more computing devices, a three-dimensional model of a virtual object;
obtaining, by the one or more computing devices, data comprising one or more image frames that depict a scene;
determining, by the one or more computing devices, a position and an orientation for the virtual object within the scene;
generating, by the one or more computing devices and using an augmented reality rendering engine, an augmented image that depicts the virtual object within the scene at the position and the orientation;
associating, by the one or more computing devices, a label with the augmented image, wherein the label at least one of: identifies the virtual object, indicates the position of the virtual object within the scene, indicates the orientation of the virtual object within the scene, indicates the segmentation label.

11. The computer-implemented method of claim 1, wherein the second head is trained based at least in part on a masked mean squared error loss between prediction and ground truth, and wherein a mask is determined based on the heat values defined by the centroid heatmap.

12. The computer-implemented method of claim 1, wherein the method is performed substantially in real-time.

13. The computer-implemented method of claim 1, wherein the machine-learned object detection model comprises an encoder-decoder backbone, and wherein the encoder-decoder backbone is configured to map the 2D image into a lower dimensional space prior to performing one or more learning tasks and map the results of the one or more learning tasks to a higher dimensional space to extract output of the plurality of heads.

14. The computer-implemented method of claim 1, wherein the machine-learned object detection model is a fully convolutional network.

15. The computer-implemented method of claim 1, wherein inputting the 2D image further comprises:
inputting, by the one or more computing devices, the 2D image into the machine-learned object detection model that comprises a multi-headed model.

16. The computer-implemented method of claim 1, wherein each pixel of the contributing pixels of the plurality of pixels contributes to computing coordinates of one of vertices associated with the bounding box for the object based on the predetermined value that is a value of a response of the pixel in the heat map.

17. A computing system comprising:
one or more processors; and
one or more non-transitory computer-readable media that collectively store instructions that, when executed by the one or more processors, cause the one or more processors to perform operations, the operations comprising:
obtaining a 2D image that includes an object, wherein the 2D image comprises a plurality of pixels;
inputting the 2D image into a machine-learned object detection model comprising a plurality of heads, wherein the plurality of heads comprise:
a first head configured to generate a centroid heat map, wherein the centroid heat map provides a respective heat value for each of the plurality of pixels, and wherein the respective heat value for each pixel describes a probability that a centroid of the object is depicted by such pixel; and
a second head configured to generate a plurality of distance fields, wherein each distance field provides a respective distance value for each of contributing pixels of the plurality of pixels, wherein the respective distance value for each pixel of the contributing pixels of the plurality of pixels indicates a distance to one of a plurality of vertices associated with a bounding box for the object, wherein each distance field provides the respective distance value for each of the contributing pixels of the plurality of pixels that has a heat value above a predetermined value;
generating the centroid heat map with the first head of the machine-learned object detection model;
generating the plurality of distance fields with the second head of the machine-learned object detection model; and
determining, based at least in part on the centroid heat map and the plurality of distance fields, a dataset comprising 3D coordinates for the bounding box associated with the object in the 2D image.

18. The computing system of claim 17, wherein
determining, by the one or more computing devices and based at least in part on the centroid heat map and the plurality of distance fields, the dataset comprising the 3D coordinates for the bounding box comprises:
identifying, by the one or more computing devices, the centroid of the object based at least in part on the centroid heat map;
applying, by the one or more computing devices, a voting scheme on the plurality of distance fields to identify a plurality of 2D projections of the vertices of the bounding box in the 2D image; and reconstructing, by the one or more computing devices, the 3D coordinates for defining the bounding box from the plurality of 2D projections of the vertices.

19. The computing system of claim 17, wherein the first head comprises a heat map head, and the second head comprises a distance field head.

20. The computing system of claim 17, wherein each pixel of the contributing pixels of the plurality of pixels contributes to computing coordinates of one of vertices associated with the bounding box for the object based on the predetermined value that is a value of a response of the pixel in the heat map.

* * * * *